United States Patent
Kim et al.

(10) Patent No.: US 10,009,097 B2
(45) Date of Patent: *Jun. 26, 2018

(54) ENHANCED TRANSMISSION AND RECEPTION OF REMOTE DIGITAL DIAGNOSTIC INFORMATION OF OPTICAL TRANCEIVERS

(71) Applicant: OE Solutions America, Inc., Ridgefield Park, NJ (US)

(72) Inventors: Jong Ho Kim, Irvine, CA (US); Wanseok Seo, Irvine, CA (US); Soonwon Hong, Seoul (KR); Moon Soo Park, Irvine, CA (US)

(73) Assignee: OE SOLUTIONS AMERICA, INC., Ridgefield, NJ (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/665,341

(22) Filed: Jul. 31, 2017

(65) Prior Publication Data

US 2017/0331548 A1    Nov. 16, 2017

Related U.S. Application Data

(63) Continuation of application No. 15/073,785, filed on Mar. 18, 2016, now Pat. No. 9,729,231.

(Continued)

(51) Int. Cl.
*H04B 10/08* (2006.01)
*H04B 10/079* (2013.01)
(Continued)

(52) U.S. Cl.
CPC ..... *H04B 10/0795* (2013.01); *H04B 10/0773* (2013.01); *H04B 10/0775* (2013.01); *H04L 1/0057* (2013.01)

(58) Field of Classification Search
CPC ........... H04B 10/0795; H04B 10/0773; H04B 10/0775; H04B 10/07955; H04B 10/07;
(Continued)

(56) References Cited

U.S. PATENT DOCUMENTS

| | | | |
|---|---|---|---|
| 7,200,344 B1 * | 4/2007 | Hoshida | H04B 10/0779 398/176 |
| 7,542,685 B2 * | 6/2009 | Bai | H04B 10/0775 398/147 |

(Continued)

*Primary Examiner* — Hibret Woldekidan
(74) *Attorney, Agent, or Firm* — Ichthus International Law PLLC

(57) ABSTRACT

Methods and apparatuses for optical communications are provided. By way of example, an optical transceiver includes a processing device coupled to a memory, an optical subassembly, and a programmable device. The optical subassembly is configured to receive and modulate a first signal carrying high speed user data for transmission to a remote device over an optical link. The programmable device is coupled to the processing device and configured to receive data relating to digital diagnostic monitoring information (DDMI) of the optical transceiver from the processing device, perform forward error correction encoding on the DDMI data to produce a remote digital diagnostic monitoring (RDDM) signal, and send the RDDM signal to the optical subassembly as a second signal to modulate for transmission. The optical subassembly is configured to current modulate the second signal on the first signal to produce a double modulated optical signal for transmission to the remote device.

8 Claims, 12 Drawing Sheets

Related U.S. Application Data

(60) Provisional application No. 62/136,268, filed on Mar. 20, 2015.

(51) Int. Cl.
  *H04L 1/00* (2006.01)
  *H04B 10/077* (2013.01)

(58) Field of Classification Search
  CPC .............. H04B 10/07953; H04B 10/40; H04B 10/0793; H04B 15/02; H04B 2210/074; H04B 10/2507; H04B 10/5161; H04B 10/697; H04B 10/50572; H04B 10/50575; H04B 10/50577; H04L 1/0057; H04Q 2011/0083; H04J 3/14
  USPC ......... 398/25–30, 32, 33, 76, 135–139, 183, 398/193
  See application file for complete search history.

(56) References Cited

U.S. PATENT DOCUMENTS

| | | | | |
|---|---|---|---|---|
| 7,822,348 | B2* | 10/2010 | Webb | G02F 1/0123 359/245 |
| 9,054,832 | B2* | 6/2015 | Barnard | H04B 10/572 |
| 9,094,128 | B2* | 7/2015 | Park | H04B 10/40 |
| 9,419,743 | B2* | 8/2016 | Barnard | H04B 10/572 |
| 9,729,231 | B2* | 8/2017 | Kim | H04B 10/0795 |
| 2002/0053062 | A1* | 5/2002 | Szymanski | H03M 13/09 714/801 |
| 2008/0052609 | A1* | 2/2008 | Peng | H03M 13/1515 714/799 |
| 2012/0189321 | A1* | 7/2012 | Whiteaway | H04B 10/504 398/183 |
| 2014/0241727 | A1* | 8/2014 | Lim | H04J 14/0298 398/76 |
| 2015/0215041 | A1* | 7/2015 | Pechner | H04B 10/1123 398/130 |
| 2016/0344508 | A1* | 11/2016 | DeAndrea | H04J 14/0278 |

* cited by examiner

Mod depth: 0%
Mask margin: 28.3 %
Mod DAC: 0

Mod. Depth: ~ 5%
Mask margin: 23.3 %
Mod DAC: 45

Mod depth: ~ 10%
Mask margin: 18.3 %
Mod DAC: 90

ENHANCED TRANSMISSION AND RECEPTION OF REMOTE DIGITAL DIAGNOSTIC INFORMATION OF OPTICAL TRANCEIVERS

CROSS-REFERENCE TO RELATED APPLICATION(S)

This application is a continuation of U.S. application Ser. No. 15/073,785, filed on Mar. 18, 2016, which relates to and claims the benefit of priority of prior U.S. Provisional Patent Application No. 62/136,268, titled "Optical Transceivers with Remote Digital Diagnostic Monitoring Functions," filed on Mar. 20, 2015, the content of which is incorporated herein by reference in its entirety.

TECHNICAL FIELD

The present disclosure relates to optical communications, and in particular, optical communications of remote digital diagnostic monitoring information of optical transceivers with advanced error correcting techniques.

BACKGROUND

Nowadays, high speed data communications are often accomplished through optical communications, in which optical transceivers communicate with each other over optical fiber channels over a distance. The optical transceivers convert electrical data signals generated by users of a network into optical signals modulated at high data rates (or data transmission rates), and vice versa. An optical transceiver includes an optoelectric component or device that includes both an optical transmitter which is configured to receive electrical signals from a host device and convert them into optical signals for transmission over an optical network, and an optical receiver which is configured to receive optical signals and converts them into electrical signals for reception by the host device. The optical transmitter and receiver in an optical transceiver may share common circuitry and a same housing. The optical transmitter may include a transmitter optical subassembly (TOSA) and the optical receiver may include a receiver optical subassembly (ROSA). The TOSA is configured to receive and convert electrical signals into optical signals for transmission over various fiber optic links and the ROSA is configured to receive and convert optical signals into electrical signals for processing.

With advances in technology, optical transceivers may include functions relating to exchanging remote digital diagnostic monitoring and control information or messages with other remote devices over an optical channel. However, the optical channel may be affected by or may experience some noisy channel characteristics as in wireless communications systems and thus there may be errors in the transmission of the remote digital diagnostic monitoring and control information or messages.

As such, there is still a need for further improved and more efficient methods and systems for communicating remote digital diagnostic monitoring and control information or messages among optical transceivers over various optical networks.

SUMMARY

This summary is not intended to identify key features or essential characteristics of the claimed subject matter, nor is it intended to limit the scope of the claimed subject matter. Example embodiments described herein relate to methods and systems for more reliable transmissions of digital diagnostic monitoring information, messages, or other data between optical transceivers that are remotely located from each other.

By way of example, an optical transceiver for optical communications in accordance with an aspect of the present disclosure is provided. The optical transceiver includes a processing device coupled to a memory, an optical subassembly, and a programmable device. The processing device may include one or more processors. The optical subassembly is configured to receive and modulate a first signal carrying high speed user data for transmission to a remote optical transceiver over an optical link. The programmable device is coupled to the processing device and configured to receive data relating to digital diagnostic monitoring information (DDMI) of the optical transceiver from the processing device, perform forward error correction encoding on the data relating to DDMI to produce a remote digital diagnostic monitoring (RDDM) signal, and send the RDDM signal to the optical subassembly as a second signal to modulate on the first signal for transmission. The optical subassembly is configured to current modulate the second signal on the first signal to produce a double modulated optical signal for transmission. The double modulated optical signal is then transmitted to the remote optical transceiver over the optical link.

In an aspect of the present disclosure, the optical transceiver may comprise a small form factor pluggable (SFP) or a 10 Gigabit small form factor pluggable (XFP) module.

In an aspect of the present disclosure, the programmable device may be further configured to perform cyclic redundancy check (CRC) on the data relating to the DDMI.

In an aspect of the present disclosure, the programmable device may comprise a field programmable gate array (FPGA).

In an aspect of the present disclosure, the programmable device may be further configured to: receive a third signal from the optical subassembly, the third signal comprising a RDDM signal from the remote optical transceiver over the optical link, perform FEC decoding operation on the third signal, and recover DDMI data relating to the remote optical transceiver.

In an aspect of the present disclosure, the second signal may comprise a laser diode (LD) bias current which is used to current modulate the second signal on the first signal to produce the double modulated optical signal having a modulation depth.

In an aspect of the present disclosure, the optical subassembly may be configured to generate the double modulated optical signal with the modulation depth in a range of about 4% and about 6%.

In an aspect of the present disclosure, the modulation depth is a ratio of a current value of the second signal to a current value of the first signal.

In an aspect of the present disclosure, the data relating to DDMI may comprise parameters relating to operation and management of various components of the optical transceiver.

In an aspect of the present disclosure, the FEC encoding may use at least BCH (31,16) codes or Reed-Solomon codes.

In an aspect of the present disclosure, a method of optical communications at an optical transceiver is provided. At a field programmable device within the optical transceiver, data relating to digital diagnostic monitoring information (DDMI) of the optical transceiver is received. The optical transceiver may be configured to modulate a first signal carrying high speed user data via an optical subassembly of the optical transceiver and further to current modulate a second signal carrying DDMI data on the first signal to produce a dual modulated optical signal for transmission to a remote optical transceiver over an optical link. Forward error correction (FEC) encoding and/or CRC may be performed on the data relating to DDMI to produce the remote digital diagnostic monitoring (RDDM) signal, which is sent to the optical subassembly of the optical transceiver as the second signal to produce the double modulated optical signal for transmission to the remote optical transceiver over an optical link. Further, the optical transceiver may be configured to receive the double modulated optical signal and demodulate the RDDM signal. FEC decoding and/or CRC may be performed on the RDDM signal and the data relating to DDMI may be recovered for further processing.

These and other features of the present disclosure will become more fully apparent from the following description and appended claims.

BRIEF DESCRIPTION OF THE DRAWINGS

A more detailed understanding may be obtained from the following description in conjunction with the following accompanying drawings.

DETAILED DESCRIPTION

Figure 1:
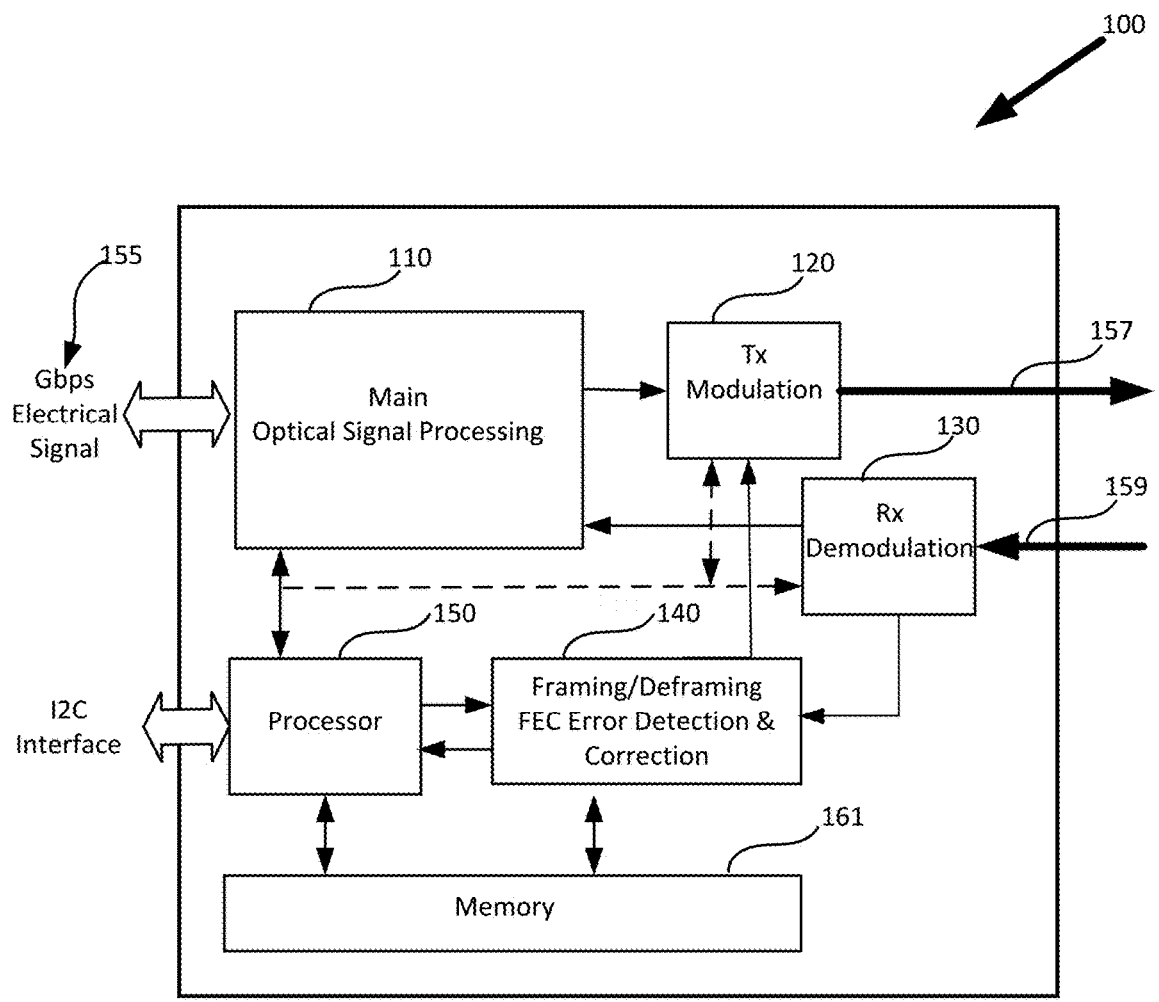
FIG. 1 illustrates an example of an optical transceiver in accordance with an aspect of the present disclosure.

The detailed description of illustrative examples will now be set forth below in connection with the various drawings. The description below is intended to be exemplary and in no way limit the scope of the claimed invention. It provides a detailed example of possible implementation(s), and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein.

Further, while examples of the present disclosure will be discussed in the context of optical transceivers or optoelectronic devices, those skilled in the art will recognize that the principles of the present disclosure may be implemented in communications of remote digital diagnostic monitoring information, control information, or other data between two remotely located electronic devices and may relate to optical and/or electrical communications. As used herein, the term "optoelectronic device" includes devices having both optical and electrical components, and examples of optoelectronic devices may include transceivers, transmitters, receivers, and/or transponders.

FIG. 1 is a simplified block diagram illustrating an example of an optical transceiver including various components for use in fiber optic communications in accordance with an aspect of the present disclosure. The optical transceiver may be used for various bandwidths of optical links, e.g., 1 Gb/s, 2 Gb/s, 4 Gb/s, 8 Gb/s, 10 Gb/s, 40 Gb/s, 50 Gb/s, 100 Gb/s, or higher, and may be implemented in various optoelectronic devices of any form factor including, but not limited to, small form-factor pluggable (SFP), 10 Gigabit small form-factor pluggable (XFP), or the like.

As shown in FIG. 1, by way of example, an optical transceiver 100 (or 100') is configured to include various components including a main optical signal processing component 110, a Tx modulation component 120, a Rx demodulation component 130, a framing/deframing FEC error detection & correction component 140, and a processing system or processor component 150.

Here, the term "processing system" or "processor component" as used herein means any hardware, software, or any combinations thereof, which are capable of performing or executing various functions or algorithms described herein in the present disclosure. The processing system (or processor component) may include, but not limited thereto, one or more processing systems including processors, central processing unit (CPU), microcontrollers, controllers, integrated circuits, application specific integrated circuits (ASIC), hardware logics, gates, field programmable gate arrays (FPGA), programmable logic circuits, or the like. The term "software" may include, but not limited thereto, any machine readable and/or executable codes, instructions, or the like, whether in high level programming languages or machine readable languages, any variants thereof, or the like, configured to perform various functions in accordance with aspects of the present disclosure.

In the example, on a transmission path, the optical transceiver 100 (or 100') may be configured to receive an electrical signal 155 carrying user traffic at a very high speed (e.g., a data transmission rate of a 10 Gigabits per second rate (Gb/s) or above) and convert the electrical signal 155 into an optical signal carrying the user traffic (or payload) for transmission to a remote device over an optical fiber link. Further, in an aspect of the present disclosure, the optical transceiver 100 may be configured to modulate on the optical signal carrying the high speed user traffic with a low speed transmission signal carrying other information or data, which is referred to as "RDDM signal," "DDMI data signal," or "second signal," such as parameters relating to health or operation of the optical transceiver 100, such as digital diagnostic monitoring information (DDMI) in order to produce a double modulated optical signal 157 through the Tx modulation component 120. Here, the term "a double modulated optical signal" refers to an optical signal with a first current modulation for main user traffic (or data) and a second current modulation for other data such as digital diagnostic monitoring information data. One technique of producing a double modulated optical signal may include a method for out-of-band data communication of digital diagnostic or other data between transceivers, as described in U.S. Pat. No. 7,630,631 B2 to Aronson et al., the content of which is incorporated by reference herein in its entirety. Further, DDMI data includes diagnostic data of the optical transceiver and various components, identification information, fault detection and monitoring information, data relating to monitoring and controlling components of the optical transceiver, or the like.

In the example, the Tx modulation component may include a laser diode (LD) driver for supporting diverse modulations, such as a direct modulation laser (DML), an external modulation laser (EML), or the like. An LD driver output of an electrical signal then drives to a modulation component for generating a main optical signal carrying the high speed user data. On a reception side, an electrical signal output from the Rx demodulation component 130 may be provided to the main optical signal processing component 110 as well as the framing/deframing FEC error detection & correction component 140. The Rx demodulation component 130 may also include a post amplifier to amplify the received electrical signal for further processing.

As noted herein, the optical transceiver 100 may be configured to perform framing and error detection and correction operations, such as forward error correction (FEC) and/or cyclic redundancy check (CRC) operations on the DDMI, into a RDDM signal carrying the DDMI data, via the framing/deframing FEC error detection & correction component 140. The RDDM single may then be provided to the Tx modulation component 120 for modulation onto the optical signal carrying the high speed user traffic into the double modulated optical signal 157 for transmission over an optical link.

On a reception path, the optical transceiver 100 is configured to receive an incoming optical signal 159 (which is a double modulated optical signal) from a remote optical transceiver and convert the incoming optical signal 159 into the electrical signal 155 carrying the high speed user traffic. Also, the optical transceiver 100 may be configured to demodulate and extract the RDDM signal, via the Rx demodulation 130, from the received incoming optical signal 159, and output to the framing/deframing FEC error detection & correction component 140, to extract or recover the DDMI data after performing deframing and FEC decoding and/or CRC operations on the received RDDM signal. The extracted DDMI data are then output to the processor component 150 for further processing of the extracted DDMI data relating to the remote optical transceiver.

In the example, as noted above, the Tx modulation component 120 may include a laser diode and a laser driver circuit for modulating the high speed user data onto an optical signal for transmission over the optical link. The Rx demodulation component 130 may include an optical receiving element such as an avalanche photo diode (APD) or PIN diode, as an optical-to-electrical signal conversion component, as in an optical transceiver design. The Rx demodulation component 130 may include signal amplifiers such as a low noise transimpedance preamplifier (TIA) and a high gain post amplifier (not shown in FIG. 1). The TIA may be configured to receive and convert a small photo diode current (e.g., a very low alternating current (AC)) into a differential voltage signal with low noise and to output the differential voltage signal to the high gain post amplifier for amplification purposes for use by following digital circuitry, e.g., digital signal processing.

The processing system 150 may be configured to perform various functions including control and management of various components of the optical transceiver 100. Further, the processing system 150 is coupled to the framing/deframing FEC error detection & correction component 140 and controls operation and management of the framing/deframing FEC error detection & correction component 140. In an aspect of the present disclosure, the processing system 150 may be implemented by or include one or more processing systems or circuits, central processing units (CPUs), microprocessors, microcontrollers, digital signal processors (DSPs), control logic, field programmable gate arrays (FPGAs), or the like. Further, the processing system 150 may be coupled to one or memory units 161 and configured to control and manage all the processing functions including main optical processing functions and RDDM functions. The one or more memory units 161 may be configured to store various parameters including the parameters relating to the health and operation conditions, etc. of the optical transceiver 100.

In an aspect of the present disclosure, the processing system 150 may be further configured to collect various data including local DDMI data, via an external interface such as an I2C interface coupled to the processing system 150, or an internal bus or one or more data interfaces, and send out the collected local DDMI data to other devices. Further, the processing system 150 is configured to control various components of the optical transceiver 100 based on the DDMI data either stored in the one or more memories 161 or received from another optical transceiver which may be located at a remote site over an optical fiber link. The I2C interface may include a data interface protocol between the processing system 150 and a host device for exchanging various types of data.

By way of example, the processing system 150 may monitor and/or control operating conditions relating to a laser diode bias, a thermoelectric cooler (TEC) temperature, power, status of various components, etc., or the like (which are herein sometimes referred to as digital diagnostic monitoring information (DDMI) or data). Typically, conventional optical transceivers can monitor and control the DDMI data of their own, but often cannot monitor and control the DDMI data of another optical transceiver which may be located at a remote site over the optical link. In an aspect of the present disclosure, the present technology described herein enables such monitoring and/or controlling of the DDMI data of another optical transceiver in a more reliable and efficient manner.

Figure 2:
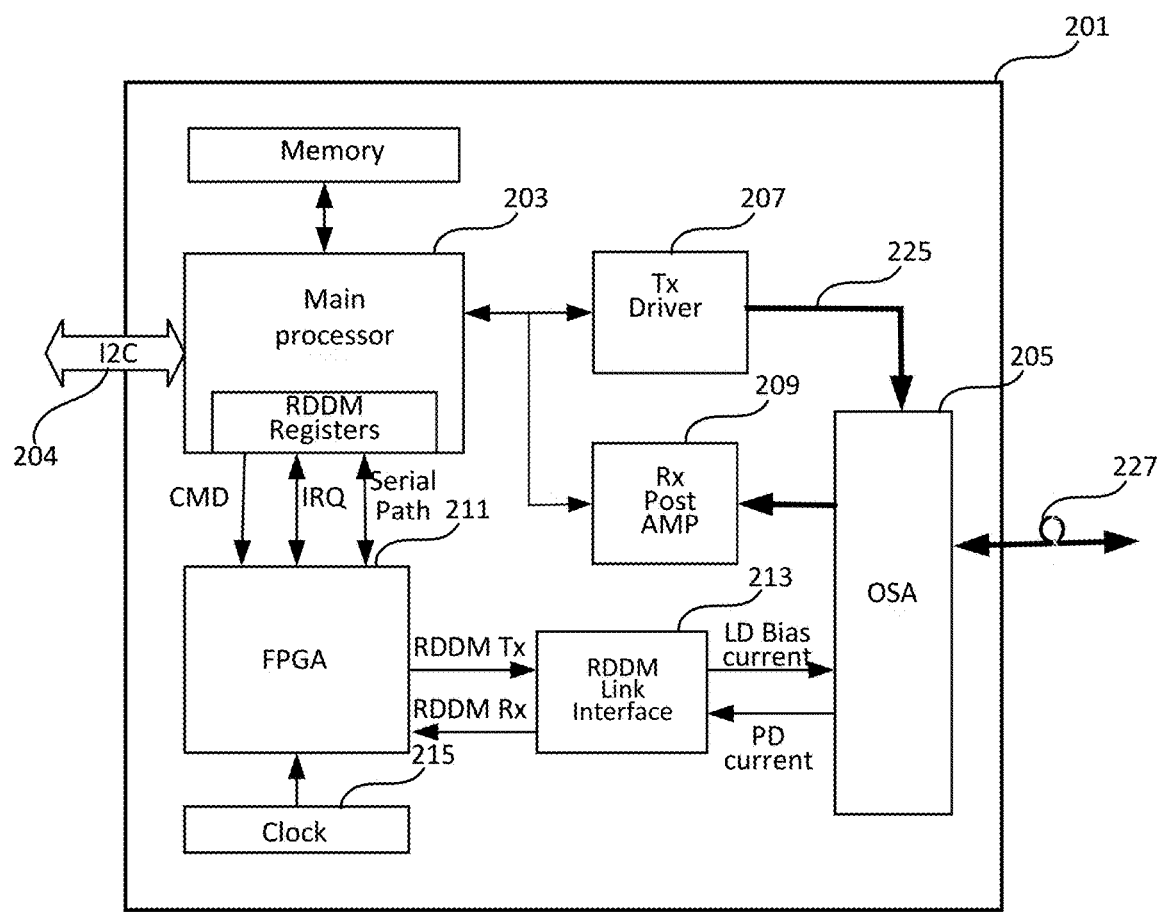
FIG. 2 illustrates another example of a bidirectional optical transceiver in accordance with an aspect of the present disclosure.

FIG. 2 is a diagram illustrating at a high level another implementation of an optical transceiver (e.g., a bidirectional optical transceiver) in accordance with an aspect of the present disclosure. In FIG. 2, a bidirectional optical transceiver 201 may include, among other components, a main processor 203 (e.g., MCU) which is coupled to an I2C interface 204, an optical subassembly (e.g., OSA) 205, a transmission driver (e.g., Tx Driver) 207, a reception post amplifier (e.g., Rx Post AMP) 209, a field programmable gate array (e.g., FPGA) 211, a remote digital diagnostic monitoring link interface (e.g., RDDM Link Interface) 213, and clock circuitry 215.

In the example, the main processor 203 of the optical transceiver 201 is configured to receive various signals, including high speed user data as well as control and/or management signals from an external device. Further, the main processor 203 may also be responsible for monitoring and/or controlling various components of the optical transceiver 201, as in FIG. 1. In FIG. 2, the main processor 203 is shown as a microcontroller unit (MCU), however, the main processor 203 is not limited thereto and thus may be implemented in one or more processors, microprocessors, microcontrollers, DSPs, ASICs), FPGAs, hardware logic, programmable gate arrays or logic, various combinations of hardware and software components, etc. The main processor 203 may also include an internal memory (not shown) which may be random access memory (RAM) or nonvolatile memory or the like, or may be coupled to a memory external to the main processor 203. Further, in the example, the main processor 203 is shown to include one or more remote digital diagnostic monitoring (RDDM) registers which are configured to interface or communicate with the FPGA 211, via various signal exchanges. The main processor 203 is configured to send various command signals (e.g., CMD) to and communicate with the FPGA 211 via interrupt line(s) (IRQ) and one or more serial paths (e.g., Serial Path), through which RDDM related information or data are transmitted to and/or received by the FPGA 211 for transmission and/or reception processing.

On a transmission path, the FPGA 211 is configured to receive RDDM data from the main processor 203. In accordance with various aspects of the present disclosure, the FPGA 211 is configured to perform RDDM framing and forward error correction (FEC) encoding functions on the RDDM (or DDMI) data received from the main processor 203. Further, the FPGA 211 is coupled to the RDDM Link Interface 213 which is disposed between the FPGA 211 and the OSA 205.

The RDDM Link Interface 213 may comprise an interface circuit such as RDDM Tx & Rx interface circuit, which is configured to operate as transmitter and receiver interfaces of RDDM signals to a laser diode and a photo detector of an optical subassembly and to produce the RDDM signals. That is, the RDDM Link Interface 213 may be configured to receive RDDM data signals (e.g., RDDM Tx) from the FPGA and produce corresponding laser diode bias current, which is provided to the OSA 205 for modulating the RDDM signals on a main optical signal 225 carrying high speed user data that is to be transmitted to a remote device, to produce a double modulated optical signal 227 for transmission over an optical link. As noted herein, the term "double modulation" or "a double modulated optical signal" may mean that there are two modulations, one current modulation for the main user traffic or data signal and another additional current modulation for the RDDM signal with the same laser diode in the optical subassembly. Further, in an aspect of the present technology, the double modulation may differ from a case of an existing double modulation using amplitude modulation of the main user traffic, in such a manner that the combined electrical signal (together with the main user traffic and RDDM data) is modulated by the current of the laser diode.

On a reception path, the OSA 205 is configured to receive the double modulated optical signal 227 carrying the high speed user data over the optical link, and send the double modulated optical signal to the reception post amplifier 209 for processing of the high speed user data by the main processor 203. Also, the OSA 205 may be further configured to extract the RDDM signal from the double modulated optical signal 227 and output to the RDDM link Interface 213 photo diode current associated with the RDDM signals. The recovered or demodulated RDDM signal is sent to the FPGA 211 in the form of RDDM Rx data by the RDDM Link Interface 213. The FPGA 211 may be configured to receive the RDDM Rx and perform RDDM deframing and FEC decoding functions in accordance with various aspects of the present disclosure. The RDDM data is extracted and sent by the FPGA 211 via the serial paths to the main processor 203 for further processing.

In the example, the RDDM Tx & Rx interface circuit may include RDDM transmitter circuit which includes an additional current modulator for RDDM signals, and bias current and modulation current settings, and may include RDDM receiver circuit which comprises photodiode current detection and amplifier circuitry, low pass filter and decision circuit(s) of a binary determination (e.g., logical "0" or "1").

Figure 3A:
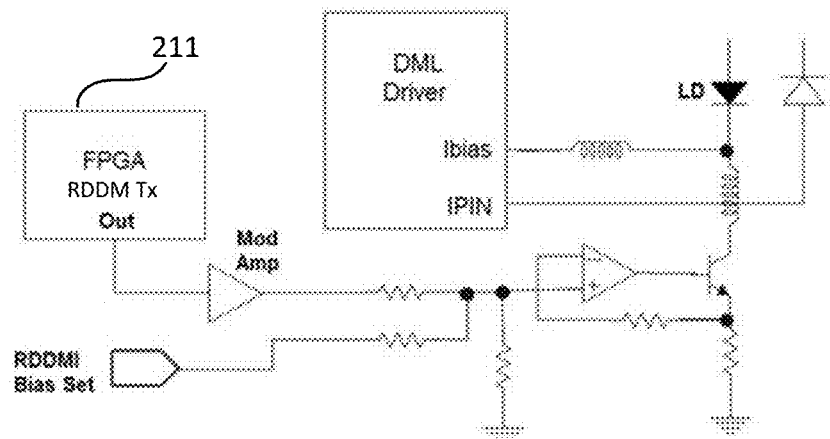
FIGS. 3A and 3B are block diagrams illustrating examples of an embodiment of the present technology in accordance with an aspect of the present disclosure.
Figure 3B:
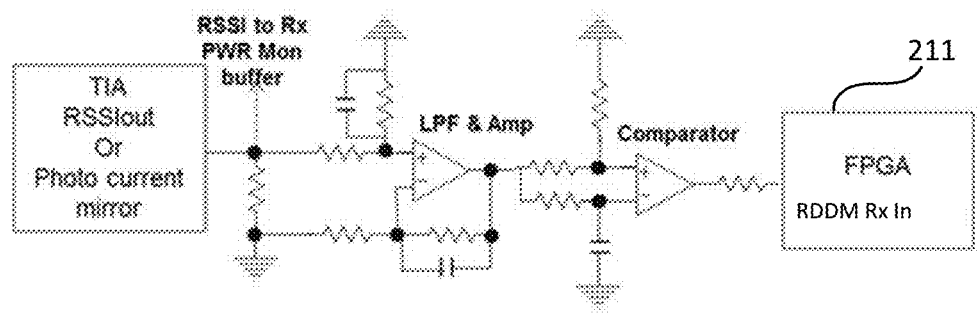

In accordance with an aspect of the present disclosure, FIG. 3A shows an example implementation of a transmitter interface portion of the RDDM Tx & Rx interface circuit, and FIG. 3B shows an example implementation of a receiver interface portion of the RDDM Tx & Rx interface circuit. In FIG. 3A, a RDDM Tx signal from the FPGA 211 is modulated and amplified, e.g., Mod Amp, and then current modulated along with a bias current (e.g., Ibias) of a main laser diode driver (e.g., a DML driver) through a transistor. In FIG. 3B, a TIA output, photo current or mirror current output is low pass filtered. The RDDM signal is of a very low frequency and the main optical signal carrying the user data is of a very high frequency. As such, the high frequency components including the main optical signal may be filtered and amplified, e.g., by LPF & Amp. The filtered and amplified signal is then converted at least in part by a comparator, as a RDDM Rx signal which is input to the FPGA 211 for processing.

In the example, the RDDM (or DDMI) data may include parameters relating to fault & alarm of an optical transceiver, performance monitoring of the optical transceiver, remote inventory of data of the optical transceiver, RDDM link status, etc. The fault & alarm parameters may include operational parameters requiring immediate action at a remote site, such as loss of optical signal (LOS), etc. The performance monitoring parameters may include parameters or data relating to Tx and Rx power, bias voltages/currents, temperature, etc. The parameters relating to the remote inventory data of the optical transceiver may include information or data on a module type, a product number (P/N), a serial number (SN), etc. of the optical transceiver. The RDDM link status may also include parameters or data relating to link failure, or in combination with LOS, out of frame (OOF), cyclic redundancy check (CRC) errors, etc.

In an aspect of the present disclosure, the OSA 205 may further include a transmitter optical subassembly (TOSA), which converts an electrical signal into an optical signal coupled to an optical fiber, and a receiver optical subassembly (ROSA), which receives an optical signal from the optical fiber and converts an optical signal into an electrical signal.

Further, in an aspect of the present disclosure, the OSA 205 may be implemented as a bidirectional optical subassembly (BOSA), i.e., a cooled single channel (CSC) BOSA including a laser diode (LD) module and a photo diode (PD) module configured to transmit and receive optical signals across the fiber optical channel. The CSC BOSA may further include or be connected or coupled to a high speed data control circuit which may include a modulator that modulates a power output of the LD module such that a high speed data signal is converted to a signal from that can be transmitted across the optical fiber channel. As noted earlier, the OSA 205 is configured to receive and modulate a main optical signal carrying high speed user data and to receive and modulate based on an additional input signal from the RDDM Link Interface 213 to produce the dual modulated optical signal 227. More specifically, the OSA 205 is configured to receive the LD bias current from the RDDM link Interface 213 and further modulate the LD module of the OSA 205 in such a manner that RDDM signals are modulated on the main optical signal carrying high speed user data to produce the double modulated optical signal 227 that carries both the high speed user data and the RDDM data.

In an aspect of the present disclosure, alternatively, the OSA 205 may also include the transmission driver 207 and/or the reception post amplifier 209 as part of the OSA 205.

Further, as noted above, the OSA 205 is configured to receive a double modulated optical signal 227 from the remote device over the fiber optic channel. The OSA 205 is configured to demodulate, recover and send the high speed user data to the reception post amplifier 209 for amplification, and to send the RDDM signal to the RDDM Link Interface 213 in the form of PD current. The RDDM Link Interface 213 may receive and extract RDDM data (e.g., RDDM Rx) from the PD current and send the extracted RDDM data to the FPGA 211 for further processing, i.e., the deframing and FEC decoding functions for recovering the DDMI data. As noted, the FPGA 211 is configured to perform the deframing and FEC decoding operations on the RDDM data to obtain the DDMI data, and forwards the DDMI data to the main processor 203 for subsequent processing. In the example, the FPGA 211 may be driven by an external clock source or circuitry such as a clock 215 or the like. Alternatively, the FPGA 211 may also be driven by an internal clock.

In an aspect of the present disclosure, as noted, as for communication between two optical transceivers over an optical link, a first optical transceiver such as the optical transceiver 201 may be configured to transmit a separate low speed transmission signal (e.g., RDDM signals), along with a very high speed main optical signal carrying high speed user data, the separate low speed transmission signal being modulated on the high speed main optical signal, as a double modulated optical signal to a remote device such as a second optical transceiver. In the example, the separate low speed transmission signal may include various messages or data such as a command or an inquiry message from the first optical transceiver, or a message responsive to the inquiry message or command from the second optical transceiver.

Responsive to the separate low speed transmission signal sent from the first optical transceiver, the first optical transceiver may receive DDMI data from the second optical transceiver. That is, after receiving the separate low speed transmission signal, the processor 150 of the second optical transceiver collects requested DDMI data of the second optical transceiver and sends the collected DDMI data to the first optical transceiver via another separate low speed transmission signal (including the collected DDMI data) as part of the double modulated optical signal transmitted to the first optical transceiver.

As noted above, the low speed transmission signal (or a RDDM signal), which may be either a command or a response, may be modulated on the main optical signal carrying high speed user data for transmission with a very small signal level. In other words, when the RDDM signal is sent with the main optical signal, a signal level of the RDDM signal modulation on the main optical signal may be very small compared to a main modulation so as to reduce any effect of the RDDM signal on the main optical signal. Further, the main optical signal may not disturb the RDDM signal.

However, when such a very low signal level is used for transmission of the RDDM signal, a receiving optical transceiver may receive incorrect or corrupted data due to various transmission errors, such as a low optical power level below an optimal range, crosstalk effect(s) of the main optical signal and RDDM signal, etc. As a result, retransmission of the RDDM signal may be needed and thus increased delay in communications between the two optical transceivers. As such, in accordance with an aspect of the present disclosure, to reduce the transmission errors of RDDM signals, use of error correction codes or techniques, such as forward error correction (FEC) and/or cyclic redundancy check (CRC) may be implemented on the RDDM signals, because use of FEC codes and/or CRC may detect and correct a limited number of errors on the transmission of the RDDM signals, thereby increasing resilience of a communication system to undesired transmission errors.

Figure 4:
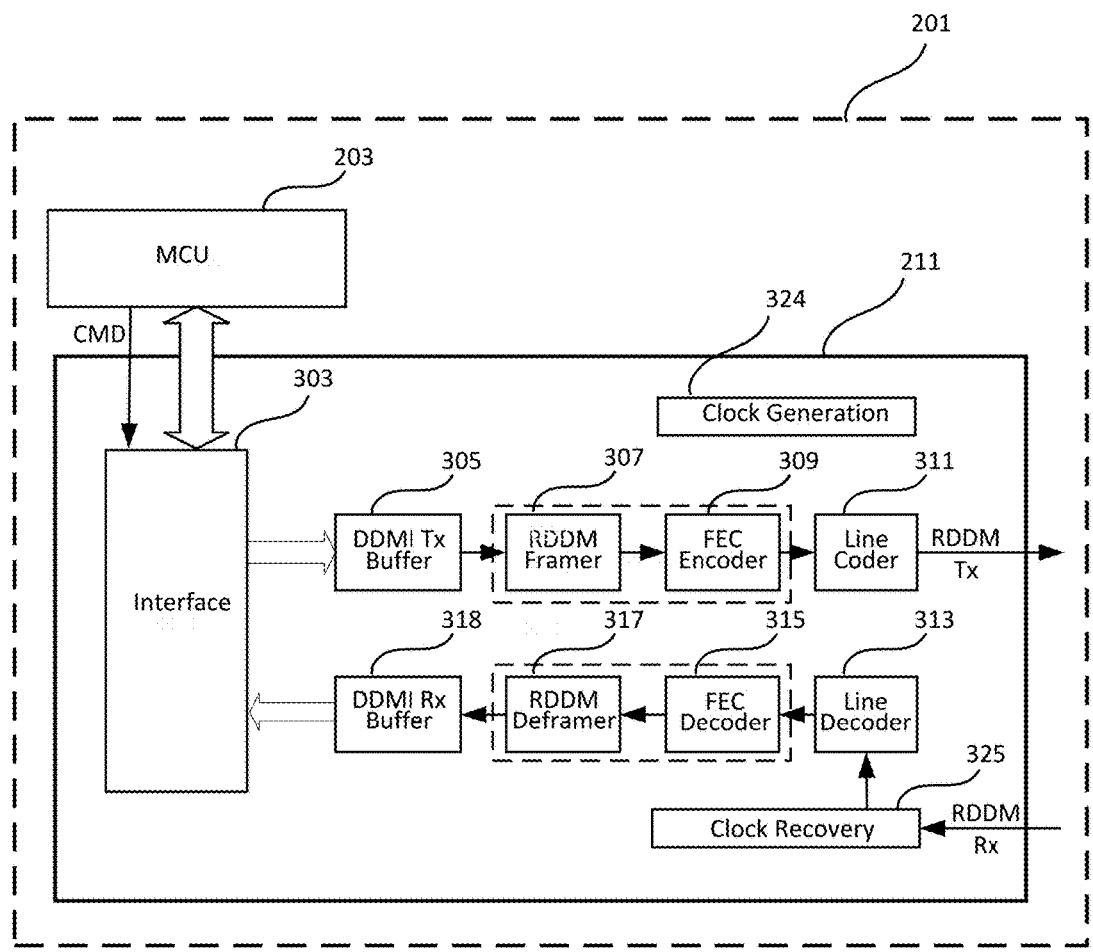
FIG. 4 illustrates an example of an optical transceiver in accordance with an aspect of the present disclosure.

FIG. 4 is a block diagram illustrating an example implementation of FEC and/or CRC in accordance with an aspect of the present disclosure. In particular, FIG. 4 shows example implementations of FEC and/or CRC in the FPGA 211 in accordance with an aspect of the present disclosure. As shown, on a transmission path, the FPGA 211 may include various components, such as an interface 303, a transmission buffer 305 (e.g., DDMI Tx Buffer), a framer 307 (e.g., RDDM Framer), a forward error correction (FEC) encoding 309 (e.g., FEC Encoder), a line coder 311 (e.g., Line Coder). The FPGA 211 further includes a clock generation 324. On a reception path, the FPGA 211 may include a clock recovery 325, a line decoder 313 (e.g., Line Decoder), a FEC decoding 315 (e.g., FEC Decoder), a deframer 317 (e.g., RDDM Deframer), and a reception buffer 318 (e.g., DDMI Rx Buffer) coupled to the interface 303. As in FIG. 2, when the RDDM reception data (e.g., RDDM Rx) is output to the FPGA 211, the clock recovery 325 receives the RDDM reception data (e.g., RDDM Rx) and outputs the RDDM reception data to the line decoder 313 for further processing. The RDDM reception data is then FEC decoded and deframed in accordance with various aspects of the present disclosure, and are then placed in the DDMI reception buffer 318 for transfer to the main processor 203 for further processing. The interface 303 is configured to transfer the RDDM data (e.g., DDMI data) in the DDMI reception buffer 318 to the main processor 203 (e.g., MCU).

On the transmission path, the RDDM data (e.g., DDMI data) is received from the main processor 203 (e.g., MCU) via the interface 303 and placed in the DDMI transmission buffer 305. Then, the RDDM Framer 307 and the FEC Encoder 309 may perform framing and FEC encoding and/or CRC on the RDDM data.

The RDDM Framer 307 and FEC Encoder 309 of the optical transceiver 201 may be collectively referred to as a "transmission encoding block" and are configured to perform framing functions of transmit data with forward error correction encoding. That is, the transmission encoding block is configured to make a frame out of transmission data including digital diagnostic message or data with error correction bits added, such as FEC parity bits. Similarly, on the reception path, the FEC Decoder 315 and RDDM Deframer 317 may be collectively referred to as a "reception decoding block" and are configured to perform FEC decoding and de-framing functions on received data.

It is noted that forward error detection and correction (or also known as "channel coding/decoding") are known techniques in wireless communications for controlling or minimizing errors in data transmission over noisy communication channels. Generally, FEC adds redundancy to transmitted information using a certain method and enables a receiver to correct errors without needing to send a request for retransmission of the information, based on the redundancy. Typically, a certain number of bits (or missing or corrupted bits) including bursty errors in the transmission may be corrected by a suitable design of FEC codes. As such, different FEC codes may be available and be used for different applications and conditions.

In accordance with an aspect of the present disclosure, in the example illustrated herein, BCH codes are selected and used for framing and FEC encoding techniques. Further, in the example, BCH (31,16) codes are used for the framing/deframing and FEC encoding/decoding at 10 Kb/s. Also, 1B2B (also known as Manchester coding) is used at 20 Kb/s for line coding at Line Coder 311 or Line Decoder 313. It is noted that BCH (31,16) codes is one example of binary block codes (also known as systematic cyclic block codes), and other codes such as Reed-Solomon codes or the like may also be used instead.

FEC coding/decoding and/or CRC techniques may be implemented in one or more programmable devices including hardware gate arrays such as FPGAs in various manners and are known and documented in various literatures. As such, detailed description of some aspects of the implementations is omitted herein. However, to provide a better understanding and appreciation of the claimed subject matter, description of some aspects of FEC and/or CRC is provided herein in accordance with aspects of the present technology. Generally, in a binary BCH (n,k) code, a k-bit message is encoded in n-bit codeword. It consists of a k-bit message and n-k parity bits. At a high level, BCH codes are generally constructed as follows: a message polynomial is obtained, the message polynomial is divided by a generator polynomial and a remainder is added to the message polynomial to form a codeword polynomial. The generator polynomial is formed by taking the least common multiple of all the minimal polynomials corresponding to roots. Further, at a receiving end, BCH decoding may be performed by first finding a syndrome vector $S=(S_1, S_2, \ldots, S_{2t})$ based on a received polynomial. An error location polynomial is determined from the syndromes. Using the roots of the error location polynomial, a number of error locators may be determined. As a result, based on the locations of detected errors, a number of errors up to t may be corrected in the received polynomial. BCH codes including BCH (31,16) codes are one of the efficient error-correcting codes used to correct errors occurred during the transmission of data in unreliable communication channels.

Alternatively, instead of the binary BCH codes, other FEC codes such as Reed-Solomon codes may also be used. Reed-Solomon codes are very robust and may correct bursty errors in the transmission of data.

Further, the BCH codes may be concatenated either with convolution codes or with other block codes such as low density parity check (LDPC) codes.

Further, cyclic redundancy check (CRC) may also be used in conjunction with the binary BCH or Reed-Solomon codes. CRC is a hash function based error detecting scheme, which detects accidental changes in the transmission of data. In CRC, a first check value is computed based on blocks of data to be transmitted and the first check value is appended to the data, before transmission of the data. The first check value is of a fixed length. On the receiving end, based on a block of received data, a second check value is computed and compared with the received first check value. If the first and second check values do not match, then the block of received data contains a data error and as such corrective action may be taken, e.g., request of retransmission of the block of data. Otherwise, when the first and second check values match, the block of data may be assumed to be error-free. When the check value is n-bits, it may be referred to as an n-bit CRC.

Figure 5A:
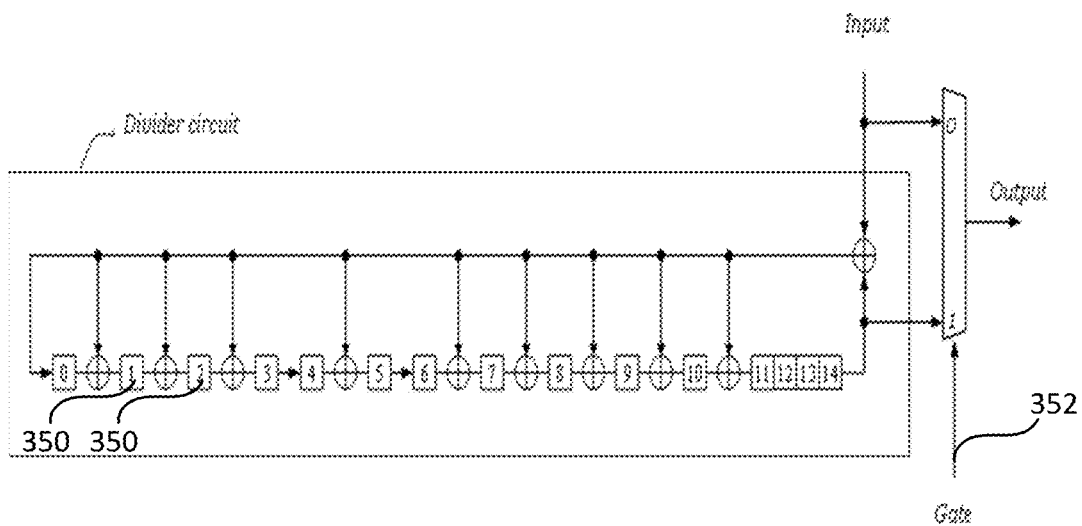
FIGS. 5A-5C illustrate example implementations in accordance with an aspect of the present disclosure.
Figure 5B:
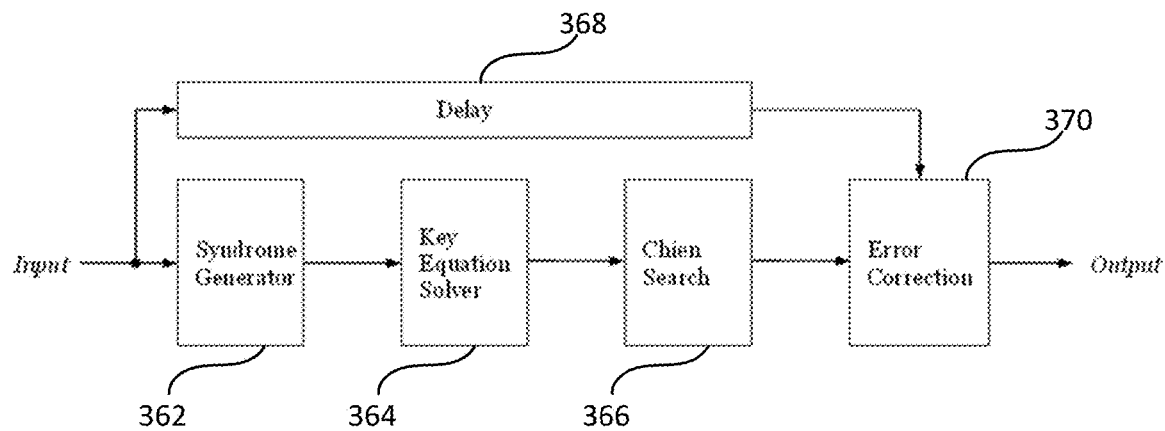

In accordance with an aspect of the present disclosure, a generator polynomial of BCH (31,16) may be given as:

$$g(x)=x^{15}+x^{11}+x^{10}+x^9+x^8+x^7+x^5+x^3+x^2+x+1$$

and its corresponding BCH encoder may be implemented using one or more divider circuits as shown in FIG. 5A. As shown in FIG. 5A, a box with a number 350 represents a D-Flipflop and $\oplus$ represents an exclusive OR gate. The example divider circuit shown in FIG. 5A is configured to calculate parity bits while receiving k-bit messages. When the example divider circuit calculates the parity bits, a gate signal 352 (e.g., Gate) is zero, which means that the incoming k-message goes out to Output. The calculated parity bits move out just after receiving the last message bit by setting the gate signal to "1". FIG. 5B shows an example of a corresponding BCH decoder structure. First, a syndrome generator 362 calculates syndromes and a key equation solver 364 determines coefficients of an error location polynomial based on the syndromes. A Chien search 366 then determines the error location based on the error location polynomial. The output of the Chien search is high, i.e., a logic value "1" when there is an error, and the output of the Chien search is low, i.e., a logic value "0" when there is no error. Error correction may be performed an error correction 370 by inverting a bit when the output of the Chien search 366 is high. Further, a delay 368 may be used to compensate a processing delay from the syndrome generator 362 to the Chien search 366.

Figure 5C:
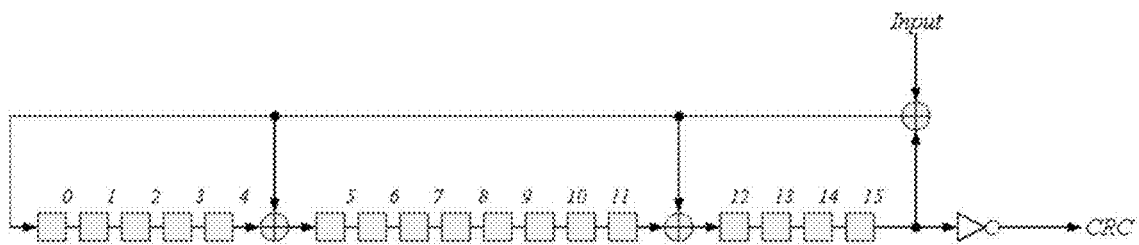

Further, in accordance with an aspect of the present disclosure, CRC may be implemented by a divider circuit in various manners. Further, in accordance with ITU-T X.25, which is incorporated herein by reference, CRC-16 encoder may be implemented and used in the present technology, as shown in FIG. 5C.

Further, in the example shown in FIG. 4, although a clock is generated internally and sourced by the clock generation 324 in the FPGA 211, the clock may be generated outside and supplied by an external source such as a processor 203.

In accordance with an aspect of the present disclosure, clock or data recovery may be performed by using multiple sampling techniques without using a phase locked loop (PLL) circuit or block. Generally, clock recovery in a receiving device may require some reference clock for proper operations. However, some line code such as self-clocking code may not require such a reference clock. Also, if a bit rate is comparably low enough to sample a data signal several times, using an independent high speed clock, clock data recovery (CDR) function may be done by detecting edge(s) of data.

Figure 6A:
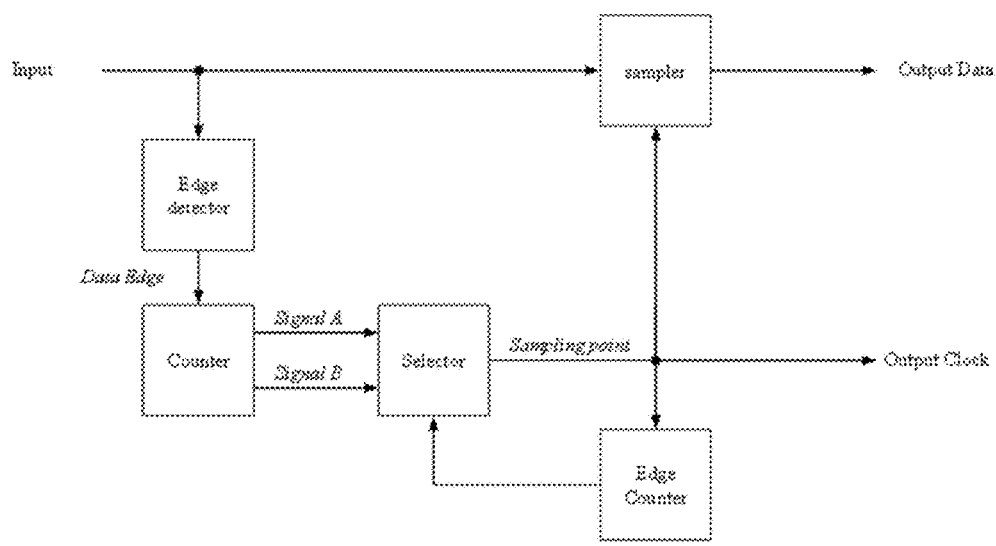
FIGS. 6A and 6B illustrate an example implementation and its associated timing diagram in accordance with an aspect of the present disclosure.
Figure 6B:
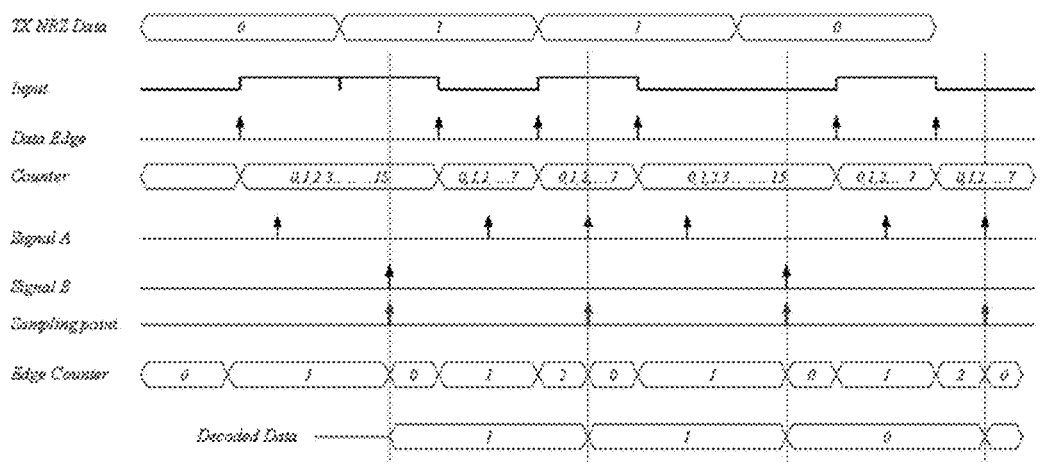

FIG. 6A illustrates an example of clock recovery logic and FIG. 6B illustrates an example of a functional operation timing for Manchester line code, in accordance with aspects of the present disclosure. The Manchester encoder encodes non-return-to-zero (NRZ) "0" to "01" and NRZ "1" to "10". The term "NRZ" as used herein refers to a form of digital data transmission in which binary low and high states are transmitted by specific and constant direct current voltages. As shown in FIG. 6B, a high speed clock samples input data. In the example, the high speed clock may be 16 times faster than the data (e.g., NRZ data). Using the high speed clock, edge(s) of the data may be easily detected. For example, sampling points may be determined using an edge counter. In an aspect, a counter which is running at the high speed clock may be reset to "0" and increase to a value at every high speed clock. The input data may be sampled at Signal A or Signal B position, e.g., Signal A is 1 at the counter value is 3, and Signal B is 1 at the counter value is 12. As such, to determine a sampling point, an edge counter may be used. The edge counter may go to 0 at a sampling point and increase by 1 at a data edge. Then, the sampling point may be determined as follows: (i) if the edge counter is 2, then Signal B is determined to be the sampling point, and (ii) if the edge counter is 1, then Signal A is determined to be the sampling point. Thus, by using data edge(s), clock and data may be recovered (e.g., CDR functions) without using a traditional, complex phase locked loop (PLL) circuit or block, which provides additional advantages or improvements such as reductions in components, size and hardware space, etc. over any existing technology requiring complex phase locked loop circuit or block.

Alternatively, the clock recovery or data recovery may be performed by using either an internal PLL circuit or block in the FPGA 211. Further, the clock or data recovery may also be performed by a device external to the FPGA 211.

In accordance with an aspect of the present disclosure, for framing and/or deframing operations, a small dimension, low-speed, low cost, low power circuitry may be used inside the FPGA 211. In particular, the framing of the RDDM data may include 10 Kbps information followed by the FEC encoding operation. Alternatively, the framing and/or deframing operations may be done by a device outside and supplied to the FPGA 211.

Further, in the example shown in FIG. 4, a line code rate, e.g., 20 Kbps with Manchester line code, is used which is below a low frequency cutoff of the main optical data signal, but other rates for common public radio interface (CPRI), Gigabit Ethernet (GbE), Fiber Channel (FC) or the like, may be used to result in additional benefits or improvements in maintaining error free transmission and reception systems. The line coder such as Line Coder 311 is configured to perform a line coding operation which determines how binary data such as "1" or "0" are represented on the optical fiber link. The line decoder such as Line Decoder 313 is configured to perform a line decoding operation corresponding to the line coding operation.

Figure 7A:
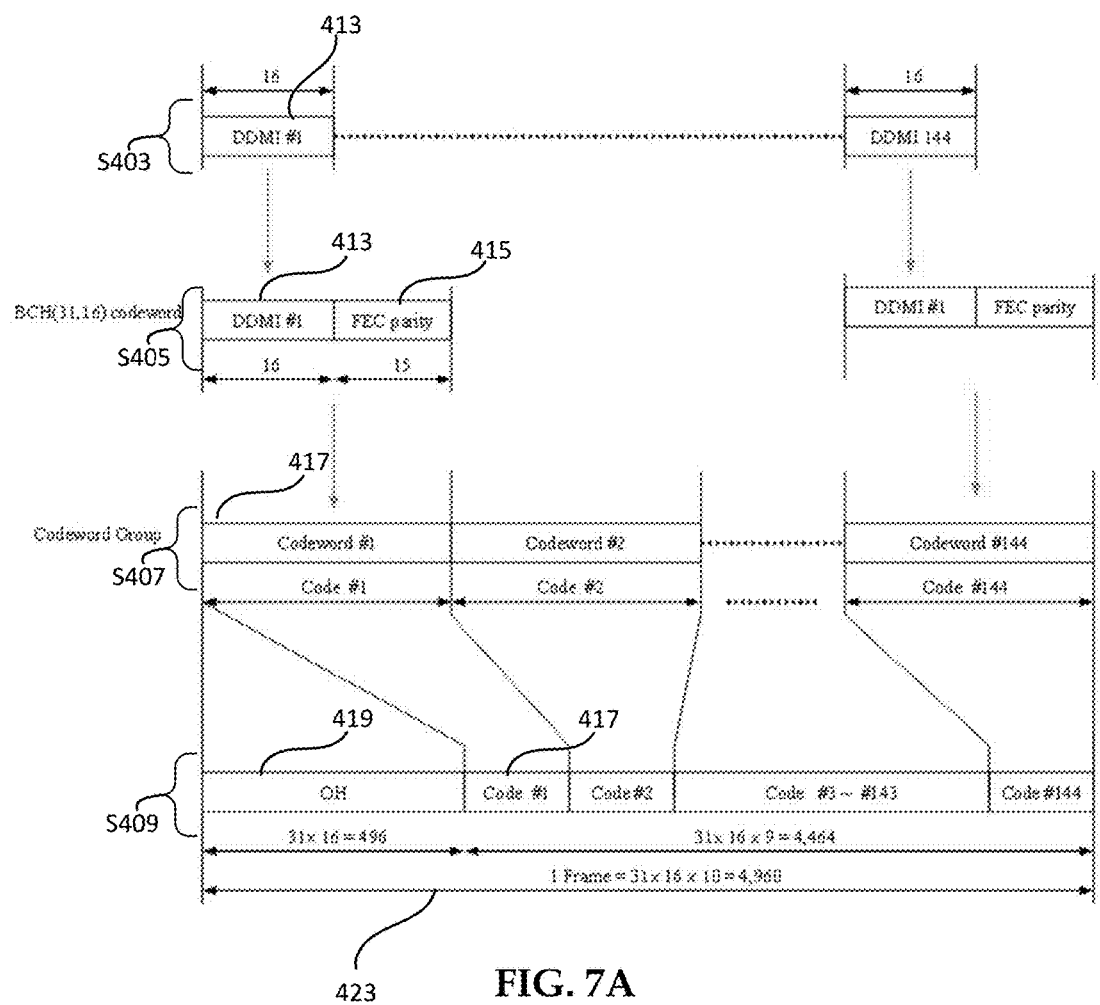
FIGS. 7A and 7B illustrate an example of a frame structure in accordance with an aspect of the present disclosure.

FIG. 7A shows an example of a framing/deframing structure in accordance with an aspect of the present disclosure. By way of example, FIG. 7A illustrates an example of framing and/or deframing processing of DDMI data in an aspect of the present disclosure. For example, one or more DDMI data may be prepared or framed into a frame of data for transmission over an optical channel, at S403-S409.

At S403, DDMI data or message 413 (e.g., DDMI#1) comprising a predetermined number of bits (e.g., 16 bits) may be received at the RDDM framer 307 via the DDMI Tx Buffer 305 as shown in FIG. 4. Here, the DDMI data 413 may be referred to as a DDMI data block. The FEC Encoder 309 performs FEC encoding processing on the received DDMI data 413, using a FEC encoding technique, e.g., BCH (31,16).

At S405, a BCH (31,16) codeword is prepared by adding 15 bits of FEC parity checking bits (e.g., FEC parity 415) to the DDMI data block 413 (e.g., DDMI#1) for the purpose of detecting and/or correcting errors on the transmitted DDMI data 413 at a receiving device. That is, the DDMI data block 413 and the FEC parity checking bits 415 make up a BCH (31,16) codeword 417 (e.g., Codeword #1).

At S407, in a similar manner described above, a total number of one hundred forty-four (144) BCH (31,16) codewords are formed as in FIG. 7A, e.g., Codeword #1, Codeword #2, . . . , and Codeword #144, based on DDMI#1, DDMI#2, . . . , and DDMI#144, respectively. In the example shown in FIG. 7A, each codeword may correspond in short form to each code, e.g., Code#1, Code#144, as part of a frame format for transmission of RDDM data, in accordance with an aspect of the present disclosure. That is, at S409, the frame format for transmission of RDDM data includes an overhead portion, e.g., OH 419 of 496 bits, and code portions including a total of 144 codes, e.g., Code #1, Code #2, . . . and Code #144, each code comprising a BCH (31,16) codeword 417. In other words, each DDMI block such as DDMI#1, DDMI#2, DDMI#144, may be mapped into a BCH encoded codeword, Code#1, Code#2, Code#144, and thereby forming a RDDM transmission frame format of a predetermined length after adding an overhead segment 419 (e.g., OH of 496 bits).

As such, as shown in FIG. 7A, one frame of RDDM data 423 for transmission (or a RDDM transmission frame) may be configured to include a total of 4,960 bits in its length, including 496 bits of the overhead portion 419 in the transmission frame. Further, the overhead portion 419 may include various information relating to processing of the frame of RDDM data.

By way of example, at the receiving device, deframing of received RDDM data is performed in a reverse sequence in accordance with the RDDM transmission frame structure as shown in FIG. 7A. At the receiving device, one or more RDDM transmission frames are received and processed. The RDDM transmission frame received at S409 may be unpacked (or separated) into one hundred forty-four (144) codewords at S407. Then, FEC decoding, along with error detection and/or correction, may be performed on each codeword (e.g., BCH (31,16) codeword) by the FEC Decoder 315, and a respective DDMI data may be recovered or obtained by RDDM Deframer 317, which then is placed into the DDMI Buffer Rx 318 for transmission to one or more processors for further processing. As noted above, since in BCH (31,16), a length of the codeword is thirty-one (31) bits, FEC decoding may correct any combination of errors a certain number of corrupted bits which is fewer than 31 in the received BCH codes, and thus provides an excellent error detection and correction capability. Further, as described below, BCH codewords may be combined with CRC to further improve receiver sensitivity by providing enhanced error detection and correction capability for transmitting and receiving RDDM data over fiber optic channels.

Figure 7B:
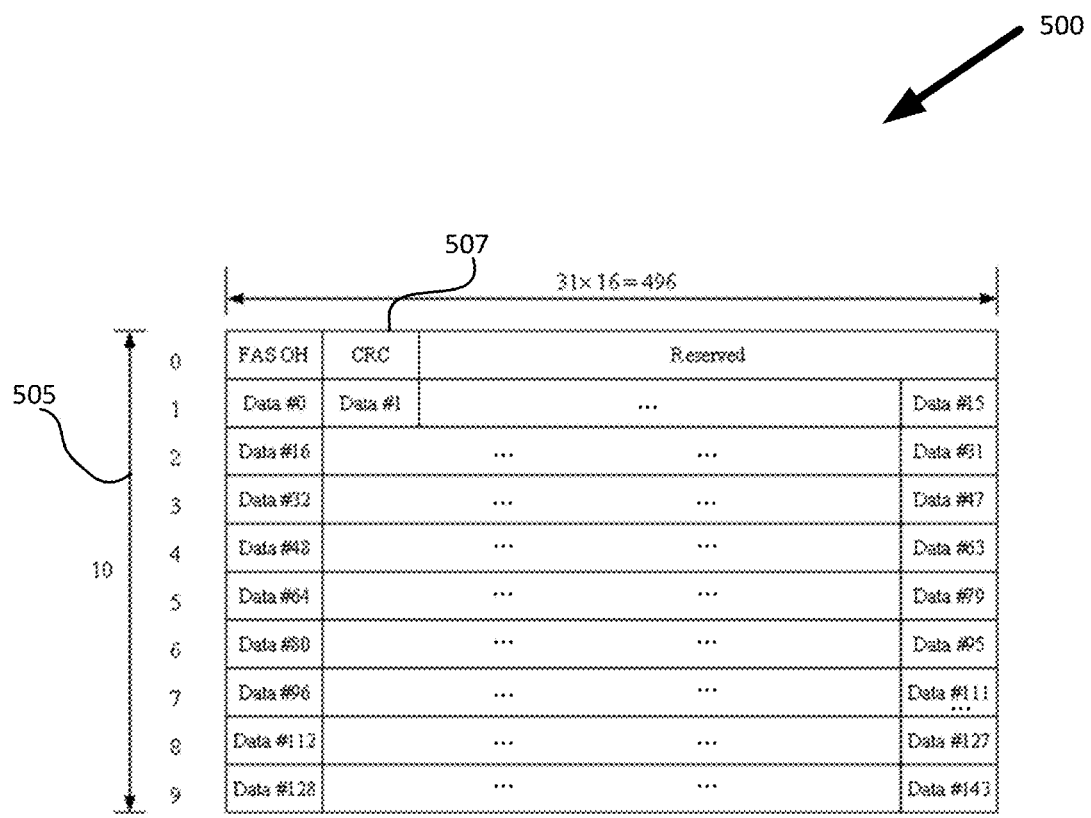

FIG. 7B shows an exemplary implementation of a frame structure in accordance with an aspect of the present disclosure. In the example shown in FIG. 7B, an example of a RDDM frame 500 may include a plurality of data segments, for example, ten data segments 505, such as a segment 0, segment 1, segment 2, . . . , and segment 9. The segment 0 may include three blocks of data such as, an overhead portion (e.g., frame alignment signal (FAS) overhead (OH)), a cyclic redundancy check portion (e.g., CRC), and reserved block (e.g., Reserved). FAS OH includes bits indicating a start of a RDDM frame, and CRC includes a value of CRC check for the entire RDDM frame for transmission. Reserved may include dummy bits for reserved use and/or spacing. Segments 1 through 9 correspond to data segments. Each segment may include 16 data blocks each corresponding to a BCH encoded codeword.

On a transmission side, as described above, with reference to FIGS. 2 and 4, DDMI data may be prepared and FEC encoded as a RDDM frame by the RDDM Framer 307 and FEC Encoder 309, e.g., framing, BCH encoding, and CRC, in accordance with a frame structure shown in FIG. 7B, and may be sent to a modulation unit in the OSA 205 (as shown in FIG. 2) in the form of a LD bias current for modulation and transmission an optical signal over an optical fiber channel to a remote device. On a reception side, the remote device receives the optical signal modulated with the RDDM frame. Subsequently, the RDDM data (e.g., RDDM Rx) may be obtained from a PD current received from the OSA 205 (as shown in FIG. 2). The RDDM Deframer may perform CRC checking on the received RDDM data for error detection and BCH decoding or error correction on the received RDDM data to produce DDMI data. From the data blocks (Data #0, Data #1, . . . , Data #144) DDMI information or data of the remote optical transceiver may be obtained and sent to one or more processing systems (e.g., the microcontroller 203, the processor 150, or the like) or other devices for further processing. That is, based on the received DDMI information exchanged between two remotely located optical transceivers or devices may communicate with each other and monitor and control operation of each other optical transceiver or device.

Having discussed implementation aspects of the present technology, some examples of performance test results are described for a deeper understanding of benefits and improvements of the present technology. In an aspect of the present disclosure, some aspects of the present technology disclosed herein may also be understood in reference to an eye diagram. The eye diagram may be used to characterize performance of a transmission and/or reception system by superposition of multiple bits of data. In general, the more open the eye is, the lower the likelihood that a receiver in a transmission system may mistake a logical "1" bit for a logical "0" bit or vice versa. That is, based on the eye diagram, a signal quality and/or signal integrity may be determined.

Figure 8A:
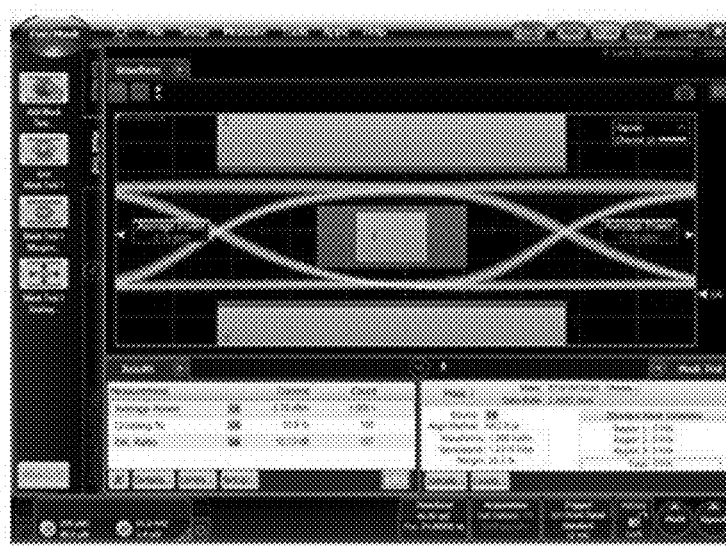
FIGS. 8A-8C illustrate examples of eye diagrams in accordance with an aspect of the present disclosure.
Figure 8B:
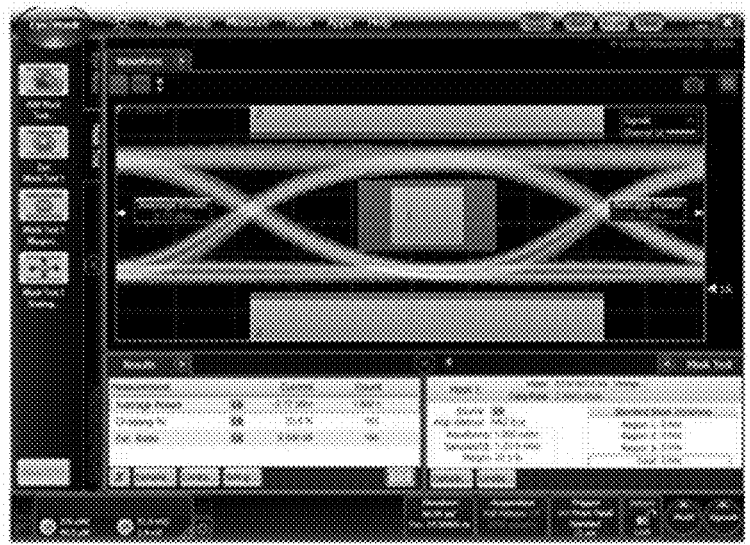
Figure 8C:
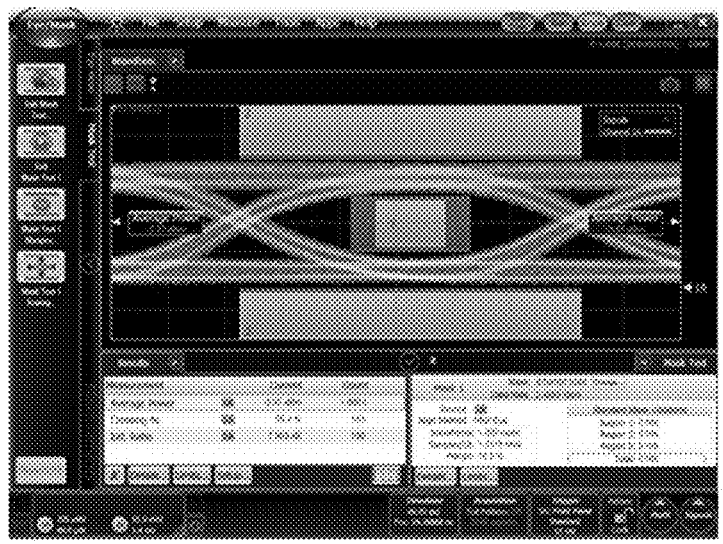

FIGS. 8A-8C illustrate graphical representations of signal quality based on examples of transmission eye shapes depending on modulation depth of RDDM signals. As shown in FIGS. 8A-8C, example eye diagrams of transmission (Tx) waveforms with RDDM channel modulation are illustrated, with a modulation depth of 0% (FIG. 8A), a modulation depth of 5% (FIG. 8B), and a modulation depth of 10% (FIG. 8C). In particular, FIG. 8A shows a Tx eye shape of main user data or traffic without any modulation of the RDDM signal (i.e., a modulation depth is 0%). FIG. 8B shows a Tx eye shape when a RDDM modulation depth of 5% is applied to a laser diode. FIG. 8C shows a Tx eye shape when a RDDM modulation depth of 10% is applied to the laser diode. In FIG. 8C, it is apparent that the Tx eye shape deteriorates due to a larger modulation depth of about 10%. As noted above, the eye diagram with the modulation depth of 10% shows more jitters and distortions (e.g., amplitude and/or phase errors) in the eye than the eye diagrams with the modulation depth of 0% in which the RDDM current modulation is not performed at all and thus only main optical data signal is transmitted and received. In the example (with FEC and/or CRC on the RDDM signals), it is noted that 5% of modulation depth may be applied to the laser diode current modulation without having any interruption of RDDM signal reception, which may have relatively less detrimental effects on the Tx eye.

Figure 9:
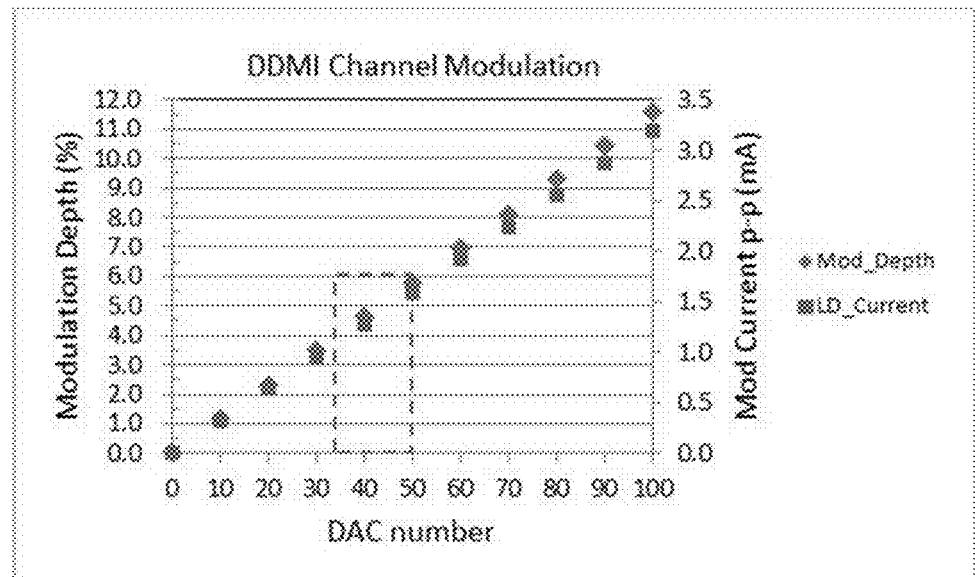
FIGS. 9 and 10 illustrate examples of performance characteristics of the present technology in accordance with an aspect of the present disclosure.

FIG. 9 illustrates another example of improved performance characteristic in accordance with an aspect of the present disclosure. FIG. 9 shows examples of RDDM modulation depths against main traffic signal modulation. In the graph shown in FIG. 9, a diamond solid shape represents a RDDM modulation depth and a square shape denotes a current peak-to-peak modulation value of a RDDM channel transmission, illustrating modulation depth (in %) versus digital-to-analog (DAC) number and modulation current peak-to-peak values in (mA). Further, the dotted line box may indicate an optimized area of the RDDM modulation for the example. In the description herein, the term "DAC number" used herein mean to denote control values for determining desired RDDM modulation amplitudes, for example, RDDM signal amplitudes of a constant current source of the RDDM Tx circuit.

Figure 10:
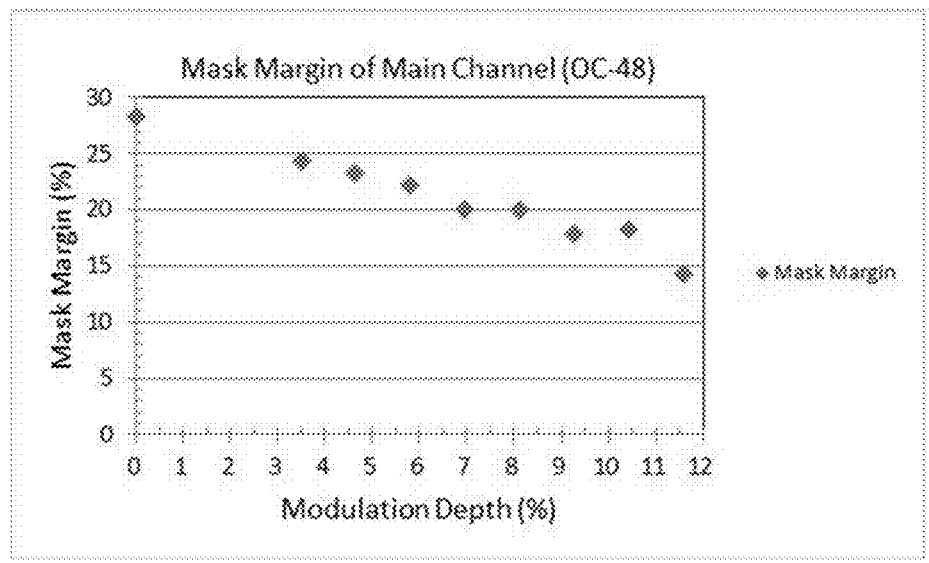

As shown in FIG. 9, as the DAC number increases the modulation depth also increases, and consequently final optical waveforms deteriorate, and FIG. 10 shows corresponding decrease in mask margin values. That is, in an aspect of the present disclosure, in FIG. 9, as the modulation depth of RDDM channel is increased, the mask margin (for example, when using OC-48 SONET mask) will deteriorate to lower values of the eye margin in a linear manner. Based on numerous simulations and tests, an optimum modulation depth may be determined to be in a range of 4%-6% of modulation depth, compared to a main optical signal without having any harmful effects on the main optical signal and the RDDM signal. That is, for an optical result, the LD bias current for a RDDM signal may be determined to have a value of LD bias current corresponding to the modulation depth of between about 4% and about 6%.

Further, as shown in FIG. 10, when the modulation depth for the RDDM signal is increased, e.g., about 4.5% to about 9%, a mask margin of a main channel (a margin of the Tx optical eye diagram), in a case of OC-48, for example, will deteriorate, for example, about 23.3% and about 18.3%. This means that compared to the case when no RDDM signal modulation is used, there will be about 5% and 10% penalty of the mask margin for 5% and 10% modulation depth, respectively. As such, to keep the Tx optical waveforms in a better shape, a lower modulation depth may be needed while maintaining the required performance of RDDM communications.

As described in the present disclosure, various embodiments of the present technology provide improved methods and systems for providing highly reliable communications of digital diagnostic information or other data between remotely located optical transceivers or devices over optical links.

In an aspect of the present disclosure, as described above, various blocks, components, or units such as RDDM Framer/Deframer, FEC Encoder/Decoder, Line coder/Decoder, etc. each may be implemented as a hardware component, a software component, or any combinations of thereof.

Various aspects of the present disclosure may also be implemented by one or more processing systems. For example, the optical transceiver 100 (or 201), or its various components as shown in FIGS. 1 and 2 may be implemented with a bus architecture, which may include a bus and any suitable number of interconnecting buses and bridges, as shown in FIG. 11.

Figure 11:
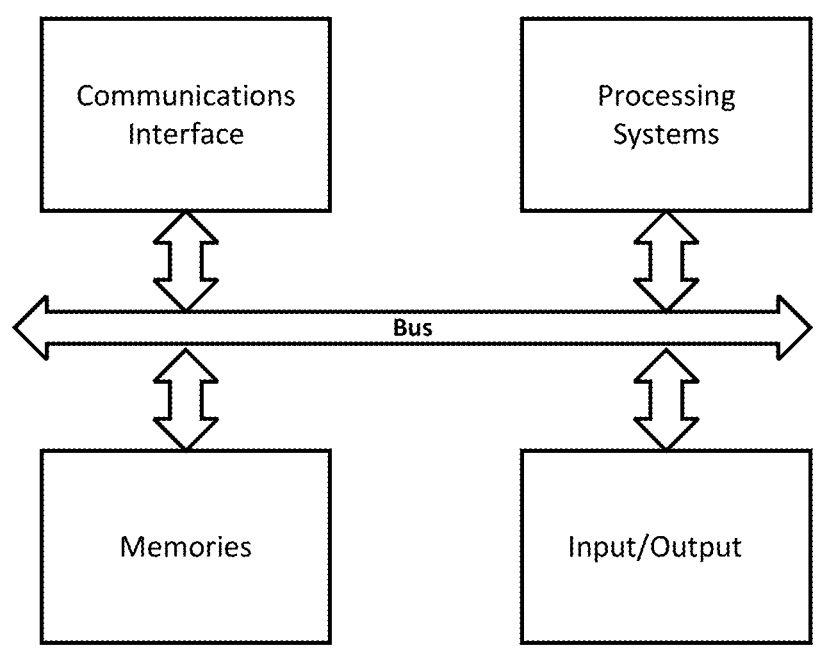
FIG. 11 illustrates an example implementation in accordance with an aspect of the present disclosure.

FIG. 11 shows a diagram illustrating an example of a processing system. As shown in FIG. 11, the bus may link together various circuits, including one or more processing systems (or processors), one or more memories, one or more communication interfaces, and/or one or more input/output devices. The one or more processing systems may be responsible for managing the bus and general processing, including the execution of software stored on a non-transitory computer-readable medium. Further, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems, including optical transceivers (e.g., TOSA and/or ROSA). The one or more input/output devices may include devices that permit inputting information and/or outputting information to an operator.

The term "small form-factor (SFP)" or "SFP module" as used herein refers to a specification for optical modular transceivers, which are designed for use with small form factor connectors and may be hot-swappable devices. The SFP modules may be multi-source agreement (MSA) compliant and allow for optical and/or electrical interfaces, converting the electrical signals to optical signals, vice versa, and may be available for use with a variety of media, such as copper media, optical fiber (e.g., multimode optical fiber, or single mode optical fiber), etc. Generally, an existing SFP module may be used to plug into a port of a network switch and connect to a fiber channel and gigabit Ethernet (GbE) optical fiber cables at the another location thereon. Thus, the existing SFP module may enable the same electrical port on the network switch to connect to different types of optical fibers, including multi-mode or single-mode fibers.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), field programmable gate arrays (FPGAs), and other suitable hardware configured to perform various functions described herein. The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

Also, the term "software" as used herein includes various types of machine instructions including instructions, code, programs, subprograms, software modules, applications, software packages, routines, subroutines, executables, procedures, functions, etc. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a particular application within design constraints.

The term "unit" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combinations thereof. The unit thus may include software components, task components, processes, procedures, functions, program code, firmware, micro-codes, circuits, data structures, tables, arrays, and variables.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein. Furthermore, the methodologies disclosed herein and throughout this specification are capable of being stored on an article of manufacture to facilitate transporting and transferring such methodologies to one or more processing systems. The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure. As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure. Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" as used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical transceiver, comprising:
   a processor coupled to a memory;
   an optical subassembly coupled to the processor and configured to receive and modulate a first signal carrying user data having a data rate of 10 Gb/s or above;
   a programmable device coupled to the processor and the optical subassembly and configured to perform error correction encoding/decoding on a remote digital diagnostic monitoring (RDDM) signal transmitted in a predetermined frame structure, to obtain a predetermined bit error rate (BER) performance when a modulation depth of a double modulated optical signal is less than 6%,
   wherein the double modulated optical signal comprises the first signal and the RDDM signal at a baseband, the RDDM signal being modulated on the first signal at the baseband as a second modulated signal, and
   wherein the RDDM signal is current modulated on the first signal using a laser diode (LD) bias current of the optical transceiver.

2. The optical transceiver of claim 1, wherein the programmable device is further configured to perform cyclic redundancy check (CRC) on the RDDM signal transmitted in the predetermined frame structure.

3. The optical transceiver of claim 1, wherein the programmable device comprises a field programmable gate array (FPGA) or a micro-processor.

4. The optical transceiver of claim 1, wherein the modulation depth of the double modulated signal comprises a ratio of a current value of the RDDM signal to a current value of the first signal.

5. The optical transceiver of claim 1, wherein the error correction encoding/decoding comprises forward error correction (FEC) encoding/decoding including either BCH encoding/decoding, Reed-Salomon encoding/decoding, or equivalent error correction functions.

6. The optical transceiver of claim 1, wherein the optical transceiver comprises a small form factor pluggable (SFP) or other optical transceivers form factors including 10 Gigabit small form factor pluggable (XFP).

7. The optical transceiver of claim 1, wherein the predetermined frame structure comprises a plurality of data segments of a predetermined length, and the plurality of data segments correspond to a plurality of codewords.

8. The optical transceiver of claim 7, wherein the predetermined frame structure includes an overhead of 496 bits and each data segment includes 31 bits.

* * * * *